United States Patent
Wang et al.

(10) Patent No.: US 10,699,053 B1
(45) Date of Patent: Jun. 30, 2020

(54) TIMING OPTIMIZATION OF MEMORY BLOCKS IN A PROGRAMMABLE IC

(71) Applicant: Xilinx, Inc., San Jose, CA (US)

(72) Inventors: Zhiyong Wang, Cupertino, CA (US); Ruibing Lu, Santa Clara, CA (US); Lin Chai, San Jose, CA (US); Sabyasachi Das, San Jose, CA (US)

(73) Assignee: XILINX, INC., San Jose, CA (US)

( * ) Notice: Subject to any disclaimer, the term of this patent is extended or adjusted under 35 U.S.C. 154(b) by 144 days.

(21) Appl. No.: 15/873,724

(22) Filed: Jan. 17, 2018

(51) Int. Cl.
*G06F 30/398* (2020.01)
*G06F 30/34* (2020.01)
*G06F 30/392* (2020.01)
*G06F 30/394* (2020.01)
*G06F 30/3312* (2020.01)
*G06F 30/39* (2020.01)
*G06F 30/327* (2020.01)
*G06F 119/12* (2020.01)

(52) U.S. Cl.
CPC ........ *G06F 30/398* (2020.01); *G06F 30/3312* (2020.01); *G06F 30/34* (2020.01); *G06F 30/392* (2020.01); *G06F 30/394* (2020.01); *G06F 30/327* (2020.01); *G06F 30/39* (2020.01); *G06F 2119/12* (2020.01)

(58) Field of Classification Search
CPC ............. G06F 17/5081; G06F 17/5077; G06F 17/5054; G06F 17/5031; G06F 17/5072; G06F 17/5068; G06F 2217/84; G06F 17/505; G06F 30/398; G06F 30/394; G06F 30/392; G06F 30/3312; G06F 30/34; G06F 2119/12; G06F 30/327; G06F 30/39
See application file for complete search history.

(56) References Cited

U.S. PATENT DOCUMENTS

| 5,648,732 | A | 7/1997 | Duncan |
| 7,319,619 | B1 * | 1/2008 | Choe .................. H03K 19/1774 365/189.05 |

(Continued)

OTHER PUBLICATIONS

Xilinx, "UltraScale Architecture Memory Resources," UG573 (v1. 5), Mar. 15, 2017, pp. 1-136, Xilinx, Inc., San Jose, California, USA.

*Primary Examiner* — Nha T Nguyen
(74) *Attorney, Agent, or Firm* — Patterson + Sheridan, LLP

(57) ABSTRACT

Methods and apparatus for implementing a circuit design are provided. A physical description is generated corresponding to a predefined physical layout of a programmable integrated circuit. The circuit design includes a memory block. A timing analysis is executed to determine a first timing profile of the physical description. The physical description is optimized (or at least altered), and a physical implementation is generated based on the optimized physical description. Optimizing the physical description includes: selectively moving from or into the memory block of the physical description a register in response to an attribute of the memory block; executing a timing analysis to determine a second timing profile of the physical description with the register moved from or into the memory block of the physical description; comparing the first and second timing profiles; and selectively accepting or reversing the moving based on the comparison of the first and second timing profiles.

20 Claims, 10 Drawing Sheets

(56) References Cited

U.S. PATENT DOCUMENTS

| | | | |
|---|---|---|---|
| 7,412,677 B1* | 8/2008 | Manohararajah | G06F 17/504 716/132 |
| 8,230,142 B1 | 7/2012 | Rohrer et al. | |
| 8,843,807 B1 | 9/2014 | Stirling et al. | |
| 8,918,748 B1* | 12/2014 | Chiu | G06F 17/5054 716/102 |
| 8,929,152 B1* | 1/2015 | Gamsa | G11C 7/20 365/189.011 |
| 9,069,920 B2* | 6/2015 | Tian | G06F 17/5045 |
| 9,208,281 B2* | 12/2015 | Vujkovic | G06F 17/5054 |
| 9,519,486 B1 | 12/2016 | Blott et al. | |
| 9,552,456 B2 | 1/2017 | Chiu | G06F 17/5081 |
| 9,602,106 B1* | 3/2017 | Bourgeault | H03K 19/1733 |
| 9,646,126 B1* | 5/2017 | Lu | G06F 17/5068 |
| 9,798,842 B1* | 10/2017 | Hutton | G06F 17/5031 |
| 10,162,916 B1* | 12/2018 | Narasimha | G06F 17/5031 |
| 10,339,244 B1* | 7/2019 | Gamsa | G06F 17/5054 |
| 2001/0042162 A1* | 11/2001 | Mes | G11C 7/1039 711/105 |
| 2002/0154659 A1* | 10/2002 | Singh | H04J 3/0623 370/535 |
| 2006/0075180 A1* | 4/2006 | Tian | G06F 17/5045 711/1 |
| 2009/0119451 A1* | 5/2009 | Haywood | G11C 5/04 711/105 |
| 2012/0102448 A1* | 4/2012 | Haugestuen | G06F 17/5031 716/134 |
| 2014/0337657 A1* | 11/2014 | Watanabe | G06F 17/5077 713/501 |
| 2016/0246911 A1* | 8/2016 | Subramaniam | G06F 17/5068 |
| 2017/0068772 A1* | 3/2017 | Nagaraj | G06F 17/5081 |
| 2018/0018417 A1* | 1/2018 | Iyer | G06F 17/5045 |
| 2018/0039716 A1* | 2/2018 | Kumar | G06F 17/505 |
| 2018/0203956 A1* | 7/2018 | Ng | G06F 17/505 |
| 2018/0349534 A1* | 12/2018 | Hashimoto | G06F 17/5031 |
| 2018/0349544 A1* | 12/2018 | Iyer | G06F 17/5081 |
| 2019/0079699 A1* | 3/2019 | Lee | G06F 3/0659 |

* cited by examiner

TIMING OPTIMIZATION OF MEMORY BLOCKS IN A PROGRAMMABLE IC

TECHNICAL FIELD

Examples of the present disclosure generally relate to electronic circuit design and, in particular, to timing optimization of memory blocks, which may be cascaded, during physical synthesis of a circuit design for a programmable integrated circuit (IC).

BACKGROUND

Circuit designs for integrated circuits (ICs) can be generated using a variety of techniques. In some examples, designers can write register-transfer level (RTL) code, write program-language code, create schematic representations, or a combination thereof to design a circuit for implementation in a target IC device. The target IC device can be a programmable IC, such as a field programmable gate array (FPGA), a mask-programmable IC, such as an application specific integrated circuit (ASIC), or the like. In the design flow, a designer creates a description of the circuit design, which is then processed through one or more steps that transform the description into a physical implementation of the circuit design for a target IC device.

In modern IC design, designing a circuit to meet timing performance goals is one of the most challenging issues faced by designers. Circuit designers spend significant time and energy to have theft designs meeting timing goals. This may be apparent when memory blocks are cascaded in a circuit design. At some instances of the design process, assumptions made for the cascade chain ultimately are incorrect. This can make implementing a cascade chain difficult, particularly with some current designs that rely on precise timing.

SUMMARY

Techniques for optimizing (or at least improving) timing of memory blocks, which may be stand-alone or cascaded, during physical synthesis of a circuit design for a programmable integrated circuit (IC) are described herein.

In an example, a method of implementing a circuit design is provided. A logical description of the circuit design is placed and routed to generate a physical description corresponding to a predefined physical layout of a programmable integrated circuit. The circuit design includes a memory block. A first timing analysis is executed to determine a first timing profile of the physical description. The physical description is altered, and a physical implementation of the circuit design is generated for the programmable integrated circuit based on the altered physical description. Altering the physical description includes: selectively moving from or into the memory block of the physical description one or more registers in response to an attribute of the memory block; executing a second timing analysis to determine a second timing profile of the physical description with the one or more registers moved from or into the memory block of the physical description; comparing the second timing profile to the first timing profile; and selectively accepting or reversing the moving from or into the memory block of the physical description the one or more registers based on the comparison of the second timing profile to the first timing profile.

Further embodiments include a circuit design system including a circuit design tool configured to perform the above method, and include a non-transitory computer-readable storage medium comprising instructions that cause a processor to perform the above method.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only example implementations and are therefore not to be considered limiting of the scope of the present disclosure.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
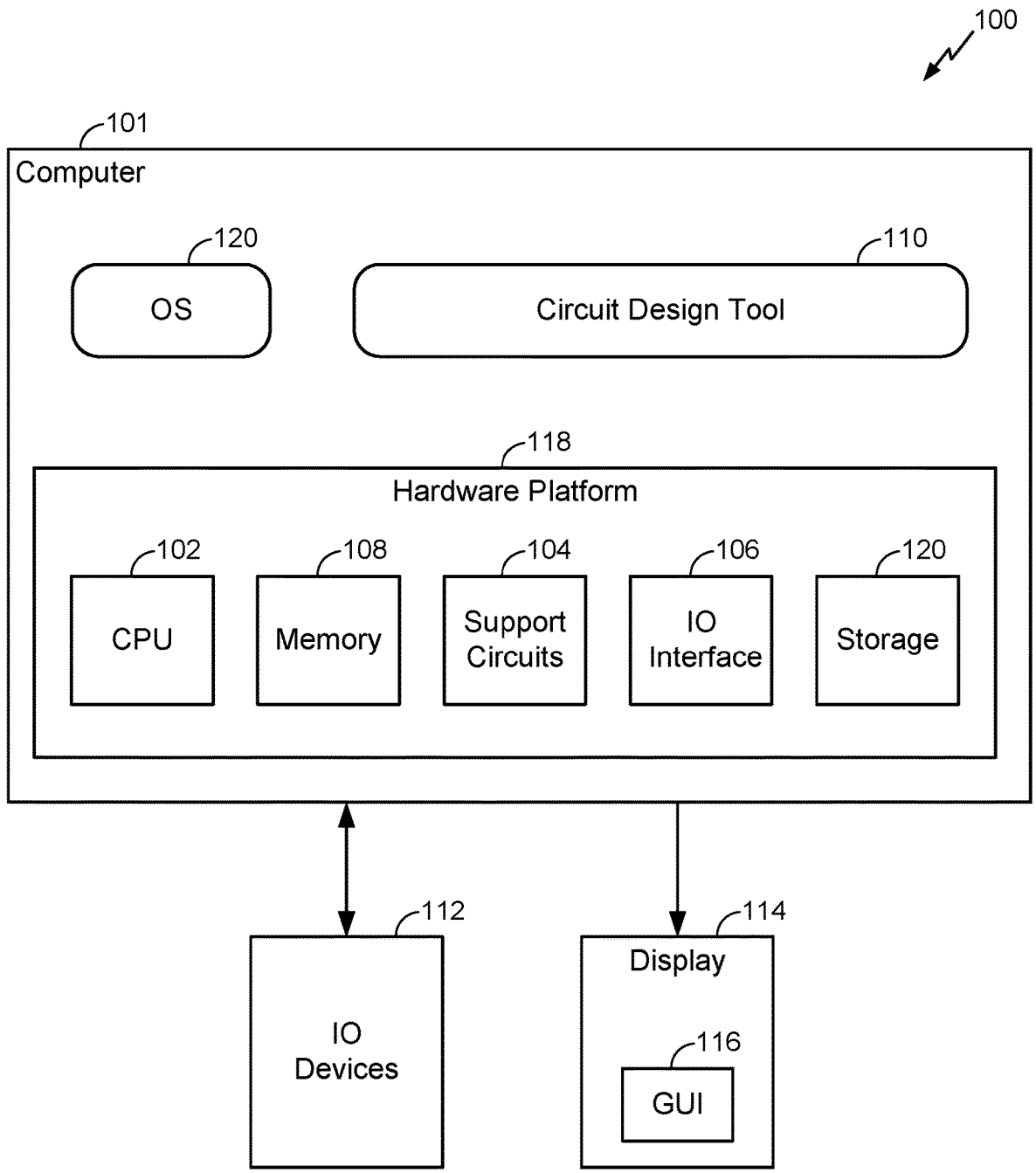
FIG. 1 is a block diagram depicting an example of a circuit design system, in accordance with an example of the present disclosure.

Generally, optional registers are pulled (e.g., removed) from or pushed (e.g., created and inserted) into a memory block during physical synthesis of a circuit design for a programmable integrated circuit (IC) to optimize (or at least improve) timing of the memory block. The registers, when pushed into the memory block, may replace registers elsewhere in the physical representation, such as in a configurable logic block (CLB), and hence, by pushing registers into the memory block, the registers elsewhere in the physical representation may be removed or deleted. Similarly, the registers, when pulled out from the memory block, may be replaced by registers elsewhere in the physical representation, such as in a CLB, and hence, by pulling registers out from the memory block, the registers elsewhere in the physical representation may be created. The registers of the memory block may be optional based on the position of the memory block in a cascade chain or based on the memory block being stand-alone. The pulling/pushing of the optional registers can modify a physical representation of the circuit design, which can possibly increase a timing performance of the physical representation. For example, by pulling or pushing a register, a route between a driver, such as in a CLB of the physical representation, may be more optimally placed with respect to a load, such as an SRAM array block in the memory block. Since the registers are optionally used, the circuit design is free to implement a physical representation that includes or does not include the registers in a way that optimizes (or at least improves) the timing performance of the memory block.

Various features are described hereinafter with reference to the figures. It should be noted that the figures may or may not be drawn to scale and that the elements of similar structures or functions are represented by like reference numerals throughout the figures. Additionally, the operations of a method or flow chart depicted in the figures or described herein may be performed in any logical order, despite any order depicted or described. It should be noted that the figures are only intended to facilitate the description of the features. They are not intended as an exhaustive description of the claimed invention or as a limitation on the scope of the claimed invention. In addition, an illustrated embodiment need not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 is a block diagram depicting an example of a circuit design system 100, in accordance with an example of the present disclosure. The circuit design system 100 includes a computer 101 coupled to input/output (IO) devices 112 and a display 114. The computer 101 includes a hardware platform 118 that can include components of a computing device, such as a central processing unit (CPU) 102, system memory 108, various support circuits 104, storage 120, and an IO interface 106. The CPU 102 can include one or more microprocessors. The CPU 102 is configured to execute instructions that perform one or more operations described herein. The instructions can be stored in system memory 108, storage 120, or any other memory in the hardware platform 118 (e.g., cache memory). The system memory 108 includes one or more devices that store information and can include, for example, random access memory (RAM), read-only memory (ROM), or a combination thereof. The storage 120 includes one or more local storage devices, such as hard disks, flash memory modules, solid state disks, optical disks, and the like. The storage 120 can also include interface(s) configured for communication with one or more network data storage systems. The support circuits 104 can include cache, power supplies, clock circuits, data registers, IO interfaces, and the like. The IO interface 106 includes interfaces to/from the computer 101. The IO interface 106 can be coupled to the IO devices 112, which can include a keyboard, mouse, and the like. The IO interface 106 can also be coupled to the display 114, which can present a graphical user interface (GUI) 116 to a user.

The computer 101 further includes a software platform comprising an operating system (OS) 122 and a circuit design tool 110. The OS 122 and the circuit design tool 110 include instructions that are executed by the CPU 102, which instructions can be stored in system memory 108, storage 120, or any other memory. The OS 122 can include any known operating system, such as Linux®, Microsoft Windows®, Mac OS®, and the like. The circuit design tool 110 is an application that executes within the OS 122, which provides an interface to the hardware platform 118. Some operation of the circuit design tool 110 is described below. An example circuit design tool that can be adapted to include the techniques described herein is the Vivado® Design Suite available from Xilinx, Inc. of San Jose, Calif., although other circuit design tools can be similarly adapted.

Figure 2:
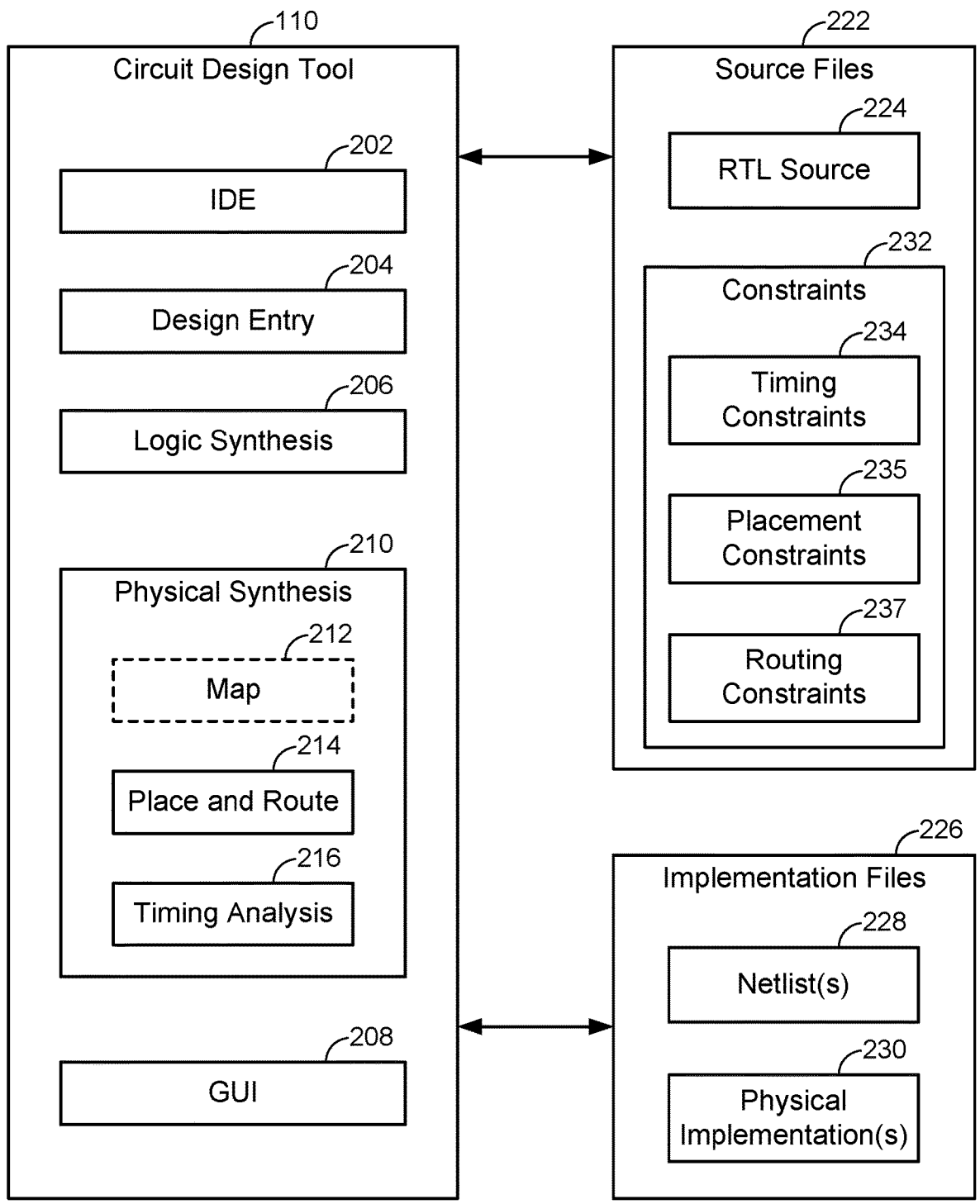
FIG. 2 is a block diagram showing an example of a circuit design tool in the circuit design system of FIG. 1, in accordance with an example of the present disclosure.

FIG. 2 is a block diagram showing an example of the circuit design tool 110. The circuit design tool 110 includes an integrated development environment (IDE) module 202, a design entry module 204, a logic synthesis module 206, a physical synthesis module 210, and a graphical user interface (GUI) module 208. The modules 202, 204, 206, 208, and 210 are just one example implementation of the circuit design tool 110. The functions performed by the modules 202, 204, 206, 208, and 210 described herein can be performed by a different configuration of one or more modules in the circuit design tool 110. The modules in the circuit design tool 110 can be implemented by circuitry that is part of an electronic system, by firmware in the electronic system, by software in the electronic system, or by a combination thereof. An example electronic system in which the circuit design tool 110 can be implemented is described above in FIG. 1.

In general, the circuit design tool 110 generates an abstract description of the circuit design, which is processed into a physical description of the circuit design for implementation in a predefined target IC ("target hardware"). The circuit design tool 110 can process the abstract description of the circuit design through various intermediate transformations to produce the physical implementation of the circuit design. For a programmable IC (e.g., a field programmable gate array (FPGA)), a physical implementation of a circuit design can be formatted and loaded into the programmable IC to produce a physical circuit. Example FPGAs that can be used as a target IC include Kintex®, Virtex®, and Zynq® series FPGAs available from Xilinx, Inc., although other types of FPGAs can also be used. For a masked-programmable IC (e.g., an application specific integrated circuit (ASIC)), a physical implementation of a circuit design can be formatted to generate a mask set. Thus, the circuit design tool 110 transforms an abstract representation of the circuit design (the abstract description) into a physical representation of the circuit design (the physical description) that can be formatted to binary data (the physical implementation) that can be used to realize physical circuits in the target hardware.

A user can interact with the circuit design tool 110 to specify source files 222. The source files 222 can include register-transfer level (RTL) source 224 and constraints 232. The RTL source 224 includes one or more files specifying the circuit design at various levels of abstraction, such as a high-level block model of the circuit design, a lower level hardware description language (HDL) model of the circuit design, or the like. The RTL source 224 can have little or no dependence on the target hardware and/or can be specific to the architecture of the target hardware. The constraints 232 include one or more files specifying constraints on the circuit design. In particular, the constraints 232 include timing constraints 234 that specify timing performance requirements of the circuit design (e.g., operating frequency of particular clocks, maximum input path delays, maximum output path delays, etc.). The constraints 232 can also include placement constraints 235 and routing constraints 237.

The circuit design tool 110 processes the source files 222 to generate implementation files 226. The implementation files 226 include one or more files specifying the circuit design with varying dependence of the target hardware. For example, the implementation files 226 can include one or more netlists 228 and one or more physical implementations 230. The netlist(s) 228 can include synthesized netlists, placed netlists, placed and routed netlists, and the like. The physical implementations 230 can include configuration bitstreams, mask files, and the like.

The IDE module 202 provides a user interface through the GUI module 208 to assemble, implement, and validate a circuit design for the target hardware. The IDE module 202 controls the overall circuit design process, including invocation of the design entry module 204, the logic synthesis module 206, and the physical synthesis module 210.

The design entry module 204 generates a functional description of the circuit design in response to user input through the GUI module 208. The functional description can include descriptions for a plurality of circuit components, such as flip-flops, memories, logic gates, processors, and the like (e.g., primitives), coupled together by connections (referred to as "nets" or "signals"). The GUI module 208 can include a graphic interface through which a circuit designer connects symbols and blocks representing various components to produce a schematic of the circuit design, which is converted into the RTL source 224. The GUI module 208 can include a text interface through which a user writes HDL code directly to produce the RTL source 224. The GUI module 208 can employ a combination of schematic and text-based entry. Via the GUI module 208, the user can access various primitives stored in the source files 222 for implementation in a circuit design. Each primitive can be in stored in the source files 222 in one or multiple, such as in a format for use as a block or symbol through the GUI module 208, in HDL code, the like, or a combination thereof.

The logic synthesis module 206 produces a logical description of the circuit design from the functional description specified in the RTL source 224. The logical description includes a logical representation of the circuit design in terms of specific logic elements. For example, the logic synthesis module 206 can perform "technology mapping" that transforms generic circuit elements into technology-specific circuit elements. For example, the logical description can include a representation of the circuit design in terms of specific logic elements optimized to the architecture of a programmable IC, such as lookup tables (LUTs), carry logic, IO buffers, and like technology-specific components. In another example, the logical description can include a representation of the circuit design in terms of gates, flip-flops, and the like (sometimes referred to as a "gate-level description"). The logical description can be specified by a netlist 228 (e.g., a synthesized netlist).

The physical synthesis module 210 produces a physical description of the circuit design from the logical description. The physical description of the circuit design is a physical representation of the circuit design for implementation in a target IC. In an example, the physical synthesis module 210 comprises a place and route module 214. The place and route module 214 is places instances of circuit components specified in the logical description within a physical predefined layout of the target IC ("placement"). The place and route module 214 also routes nets between the instances specified in the logical description using wires in the target IC. In an example, the target IC comprises a programmable IC, and the physical synthesis module 210 includes a map module 212. The map module 212 maps the instances of circuit components specified in the logical description onto specific types of primitive components defined in the architecture of the target programmable IC (e.g., a CLB, block RAM (BRAM), Ultra RAM (URAM), IO block (IOB), or the like), which are then placed and routed by the place and route module 214. The physical description can be specified by a netlist 228 (e.g., a placed-and-routed netlist). The physical synthesis module 210 can generate a physical implementation 230 from the physical description (e.g., a configuration bitstream for a programmable IC or mask set for an ASIC).

In an example, the physical synthesis module 210 comprises a timing analysis module 216. The timing analysis module 216 performs a timing analysis of the physical description of the circuit design. The timing analysis module 216 verifies that the physical description meet the timing constraints 234 specified by the circuit designer. The timing analysis can include various timing checks to ensure that the circuit design is fully constrained and that the circuit design meets timing requirements (e.g., slack for timing paths) derived in response to the timing constraints 234. Paths that do not meet timing constraints 234 are prioritized in a decreasing order, and different placement algorithms and heuristics are applied to those paths to alter or change the paths, according to the prioritization. Following the changes, incremental placement and routing is performed, and a timing analysis is performed on the altered placement and routing. Any change that improves timing is accepted, while any change that degrades timing is rejected. The physical synthesis can be iteratively performed until the timing constraints 234 are met.

In the following figures, various circuit diagrams are illustrated. In description corresponding with those figures, any node, such as an input node or an output node, may be described in the singular; however, this is for ease of description. Any node may include a single node corresponding to a single bit, and/or multiple, parallel nodes corresponding to respective multiple bits.

Figure 3:
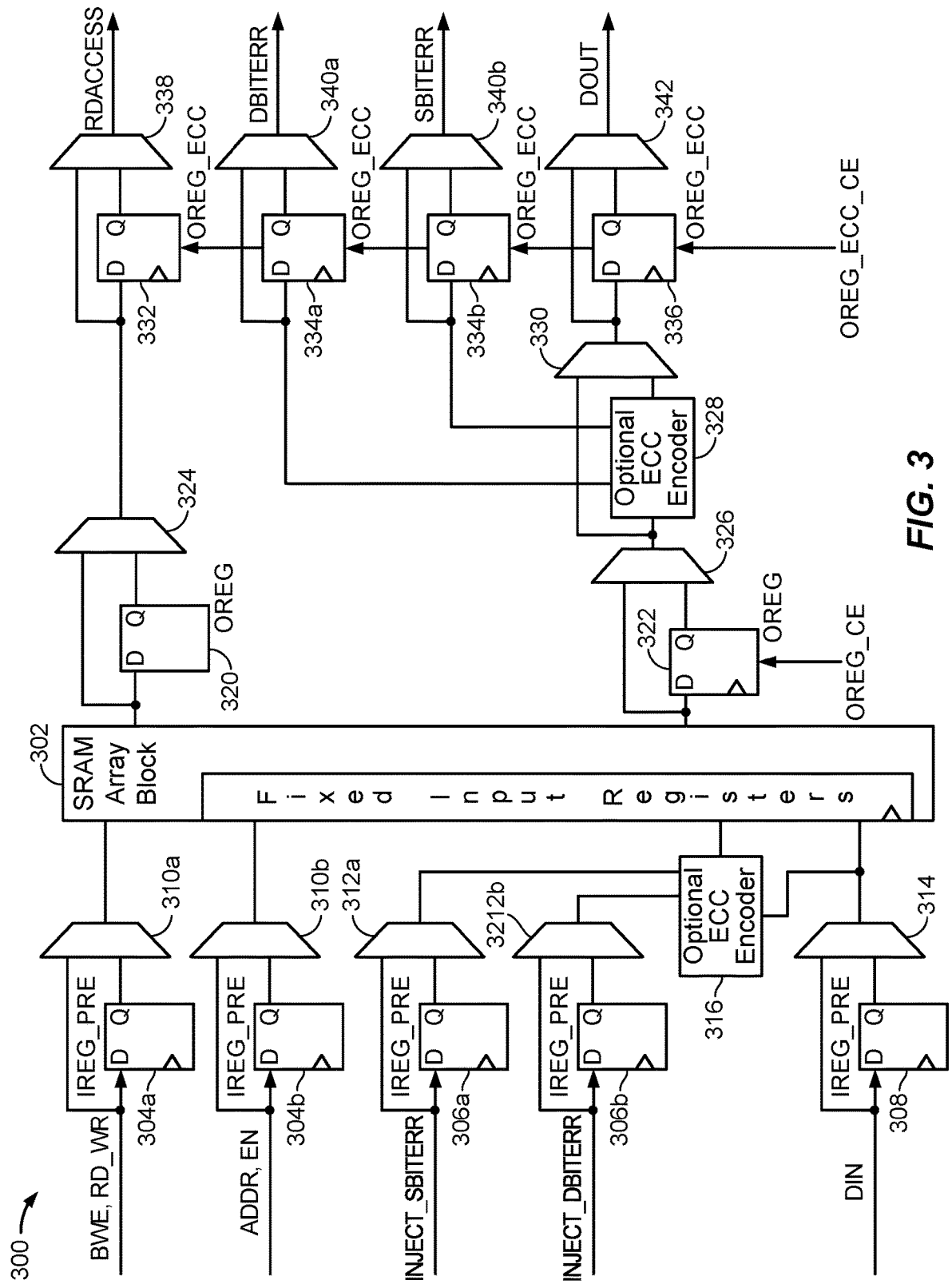
FIG. 3 is a block diagram depicting an example of a functional description of a memory block that may be instantiated on a programmable integrated circuit (IC), in accordance with an example of the present disclosure.

FIG. 3 is a block diagram depicting an example of a functional description of a memory block 300 that may be instantiated on a programmable IC, in accordance with an example of the present disclosure. The memory block 300 includes an SRAM array block 302, which may be on-chip memory of the programmable IC. The memory block 300 includes various registers and multiplexers, which may be instantiated in one or more CLBs of the programmable IC. Examples of the programmable IC include the Kintex®, Virtex®, and Zynq® series FPGAs that implement the UltraScale+™ architecture. In some examples, the memory block 300 can be an UltraRAM memory block, and the SRAM array block 302 can be 288K bits configured as a 4k×72 memory block. The programmable IC can have multiple physical memory blocks available for instantiation. The programmable IC can have physical memory blocks arranged in columns and with a same clock. For example, a column in a single clock region can contain 16 memory blocks 300. Other devices, which can implement different architectures and/or have different SRAM array block sizes, may implement a memory block according to aspects described herein.

The memory block 300 is illustrated with a single port, although in other examples, the memory block can have one or multiple ports. The functional description of the memory block 300 may be in a format of a primitive stored as a file or other data object, e.g., in the source files 222 that are accessible by the circuit design tool 110 and configurable by the user via the GUI module 208.

The memory block 300 includes an input stage. The input stage includes input pipeline registers 304a, 304b, 306a, 306b, and 308, multiplexers 310a, 310b, 312a, 312b, and 314, and an error correction coding (ECC) encoder 316. A byte-wide write enable input node BWE and a read/write mode select input node RD_WR are coupled to an input node of input pipeline register (IREG_PRE) 304a and to an input node of the multiplexer 310a. The BWE and RD_WR may each be a single bit or multiple bits. An output node of the IREG_PRE 304a is coupled to another input node of the multiplexer 310a. An output node of the multiplexer 310a is coupled to an input node of the SRAM array block 302. An address input node ADDR and an enable/disable read/write access input node EN are coupled to an input node of IREG_PRE 304b and an input node of the multiplexer 310b. The ADDR and EN may each be a single bit or multiple bits, although the ADDR is typically multiple bits. An output node of the IREG_PRE 304b is coupled to another input node of the multiplexer 310b. An output node of the multiplexer 310b is coupled to an input node of the SRAM array block 302.

An inject single-bit error input node INJECT_SBITERR is coupled to an input node of IREG_PRE 306a and to an input node of the multiplexer 312a. The INJECT_SBITERR may be a single bit. An output node of the IREG_PRE 306a is coupled to another input node of the multiplexer 312a. An output node of the multiplexer 312a is coupled to an input node of the ECC encoder 316. An inject double-bit error input node INJECT_DBITERR is coupled to an input node of IREG_PRE 306b and to an input node of the multiplexer 312b. The INJECT_DBITERR may be a single bit. An output node of the IREG_PRE 306b is coupled to another input node of the multiplexer 312b. An output node of the multiplexer 312b is coupled to an input node of the ECC encoder 316.

A write data in input node DIN is coupled to an input node of IREG_PRE 308 and to an input node of the multiplexer 314. In this example, the DIN includes respective multiple bits for data input, and in other examples, DIN may be a single input node for a single bit for data input. An output node of the IREG_PRE 308 is coupled to another input node of the multiplexer 314. An output node of the multiplexer 314 is coupled to an input node of the ECC encoder 316 and to an input node of the SRAM array block 302. An output node of the ECC encoder 316 is coupled to an input node of the SRAM array block 302.

The memory block 300 includes an output stage. The output stage includes output pipeline registers 320 and 322, an ECC decoder 328, ECC decoder output pipeline registers 332, 334a, 334b, and 336, and multiplexers 326, 330, 338, 340a, 340b, and 342. An output node of the SRAM array block 302 is coupled to an input node of the output pipeline register (OREG) 322 and to an input node of the multiplexer 326. An output node of the OREG 322 is coupled to another input node of the multiplexer 326. The OREG 322 has a clock enable input node OREG_CE.

An output node of the multiplexer 326 is coupled to an input node of the ECC decoder 328 and to an input node of the multiplexer 330. An output node of the ECC decoder 328 is coupled to another input node of the multiplexer 330. An output node of the multiplexer 330 is coupled to an input node of the ECC decoder output pipeline register (OREG_ECC) 336 and an input node of the multiplexer 342.

An output node of the OREG_ECC 336 is coupled to another input node of the multiplexer 342. An output node of the multiplexer 342 is a read data out output node DOUT.

Another output node of the ECC decoder 328 is coupled to an input node of the OREG_ECC 334a and to an input node of the multiplexer 340a. An output node of the OREG_ECC 334a is coupled to another input node of the multiplexer 340a. An output node of the multiplexer 340a is a double-bit error status output node DBITERR. Another output node of the ECC decoder 328 is coupled to an input node of the OREG_ECC 334b and to an input node of the multiplexer 340b. An output node of the OREG_ECC 334b is coupled to another input node of the multiplexer 340b. An output node of the multiplexer 340b is a single-bit error status output node SBITERR.

An output node of the SRAM array block 302 is coupled to an input node of the OREG 320 and to an input node of the multiplexer 324. An output node of the OREG 320 is coupled to another input node of the multiplexer 324. An output node of the multiplexer 324 is coupled to an input node of the OREG_ECC 332 and to an input node of the multiplexer 338. An output node of the OREG_ECC 332 is coupled to another input node of the multiplexer 338. An output node of the multiplexer 338 is a read status output node RDACCESS. The OREG_ECCs 332, 334a, 334b, and 336 have respective input nodes coupled to a clock enable input node OREG_ECC_CE.

Although not specifically illustrated, a clock node CLK is coupled to input nodes of sequential logic in the memory block 300, such as the IREG_PREs 304a, 304b, 306a, 306b, and 308, OREGs 320 and 322, and OREG_ECCs 332, 334a, 334b, and 336. Hence, the port of the memory block 300, and any additional port, can be synchronous with a single clock signal.

The data on DIN includes the data to be written to the SRAM array block 302 during a write operation. The data on DIN can be configured to include parity bits depending on a parity mode. The parity mode can indicate whether parity bits are interleaved in the data on DIN. In some examples, the parity mode can be parity interleaved or parity independent. For example, the DIN can be 72 bits. In this example, if the parity mode is configured to be parity interleaved, the upper 8 bits of DIN, e.g., DIN[71:64], can be parity bits, with each bit corresponding to a byte of DIN, such as DIN[64] being the parity bit of DIN[7:0], DIN[65] being the parity bit of DIN[15:8], etc., and if the parity mode is configured to be parity independent, DIN may or may not include any parity bits. Other parity schemes may be implemented.

The signal on BWE can indicate how data on DIN is to be written. The functional description, e.g., the primitive, can be configurable by the user to have different write modes. As described previously, the data on DIN can include parity bits depending on a parity mode. Depending on whether parity bits are included, each bit of the BWE can enable the writing of a corresponding byte of DIN. For example, BWE can be 9 bits, and DIN can be 72 bits. In this example, if the parity mode is configured to be parity interleaved, the upper 8 bits of DIN, e.g., DIN[71:64], can be parity bits, with each bit corresponding to a byte of DIN, such as DIN[64] being the parity bit of DIN[7:0], DIN[65] being the parity bit of DIN[15:8], etc., and each bit of BWE, except one bit such as un upper bit BWE[8] for example, can determine whether writing is enabled for a corresponding parity bit and byte of DIN, such as BWE[0] corresponding to DIN[64, 7:0], BWE[1] corresponding to DIN[65, 15:8], etc. If, in this example, the parity mode is configured to be parity independent, each bit of BWE can determine whether writing is enabled for a corresponding byte of DIN, such as BWE[0] corresponding to DIN[7:0], BWE[1] corresponding to DIN[15:8], etc. The BWE may be ignored during a read operation.

The signal on RD_WR indicates whether a read operation or a write operation is to be performed for the corresponding clock cycle. In some examples, the RD_WR is a single bit. In those examples, when a logical high (e.g., "1") is asserted, a write operation is to be performed, and when a logical low (e.g., "0") is asserted, a read operation is to be performed, or vice versa.

The data on ADDR indicates a memory cell in the SRAM array block 302 to which data is to be written in a write operation or from which data is to be read in a read operation. As described below, the memory block 300 may be cascaded. Some bits of ADDR may indicate which block within the cascade chain contains the memory cell to be written/read, while other bits of ADDR may indicate which memory cell within the identified block of the cascade chain is to be written/read. If the memory block 300 is not cascaded, the bits that indicate a block within a cascade chain may be unused. In some examples, ADDR is 23 bits, with the lower 12 bits (e.g., ADDR[11:0]) indicating a memory cell and the upper 11 bits (e.g., ADDR[22:12]) indicated a memory block in a cascade chain. Other formats for ADDR may be implemented.

The signal on EN indicates whether a read/write operation is enabled. In some examples, the EN is a single bit. In those examples, when EN is a logical high (e.g., "1"), a read/write operation is enabled (where the data on RD_WR indicates whether a read operation or a write operation is to be performed), and when EN is a logical low (e.g., "0"), writing to the SRAM array block 302 is disabled and data on output nodes of the SRAM array block 302 retain their previous state, or vice versa.

A user may test data written to the SRAM array block 302 by configuring the memory block 300 to include the INJECT_SBITERR, INJECT_DBITERR, and ECC encoder 316. For example, an attribute of the primitive of the memory block 300 can determine whether the INJECT_S-BITERR, INJECT_DBITERR, and ECC encoder 316 are used. When data on INJECT_SBITERR and/or INJECT_D-BITERR is properly asserted, the ECC encoder 316 can insert a single-bit error and/or a double-bit error, respectively, to data that is written to the SRAM array block 302. The INJECT_SBITERR, INJECT_DBITERR, and ECC encoder 316 may be omitted.

As is apparent to a person having ordinary skill in the art, the SRAM array block 302 includes logic (not specifically illustrated) that responds appropriately to data and/or signals on different input nodes of the SRAM array block 302. For example, if a signal on EN indicates that a read/write operation is disabled, the logic responds to that signal to disable writing to the SRAM array block 302 and retain data on output nodes of the SRAM array block 302. A person having ordinary skill in the art will readily understand logic that may be included in the SRAM array block 302 that permits operation based on data and/or signals of the various input nodes as described above.

A user can configure the memory block 300 to include ECC decoder 328 to identify single-bit errors and/or double-bit errors based on data output from the SRAM array block 302. The ECC decoder 328 indicates single-bit errors and/or double-bit errors by outputting data to SBITERR and/or DBITERR, respectively. For example, an attribute of the primitive of the memory block 300 can determine whether the ECC decoder 328 is used and whether data on SBITERR and DBITERR is valid.

Data on DOUT is data that is read from the SRAM array block 302 during a read operation and, if the memory block 300 is configured to include the ECC decoder 328, decoded by the ECC decoder 328. In some examples, the DOUT can be 72 bits.

The SRAM array block 302 generates a signal on RDAC-CESS to indicate that a read operation finished executing, which can indicate when new data is available at the DOUT. In some examples, when the signal on RDACCESS is a logical high (e.g., "1"), the signal indicates a read operation has been executed in the SRAM array block 302.

The primitive of the memory block 300 can be configurable to enable pipeline registers. For example, one or more attributes of the primitive of the memory block 300 can be set by a user to indicate whether pipeline registers are used. An input pipeline register attribute IREG_PRE_ATT can configure whether IREG_PREs 304a, 304b, 306a, 306b, and 308 are used in the memory block 300. An output pipeline register attribute OREG_ATT can configure whether OREGs 320 and 322 are used in the memory block 300. An ECC decoder output pipeline register attribute OREG_EC-C_ATT can configure whether OREG_ECCs 332, 334a, 334b, and 336 are used in the memory block 300. When the IREG_PRE_ATT, OREG_ATT, and OREG_ECC_ATT are appropriately asserted, IREG_PREs, OREGs, and OREG_ECCs, respectively, are inserted into the memory block 300 for instantiation. Conversely, when the IREG_PRE_ATT, OREG_ATT, and OREG_ECC_ATT are not appropriately asserted, IREG_PREs, OREGs, and OREG_ECCs, respectively, are not inserted into the memory block 300 for instantiation. Logically, this can be viewed as the IREG_PRE_ATT, OREG_ATT, and OREG_ECC_ATT being a select control input to respective ones of the multiplexers to select the output of the respective pipeline register to propagate through as the output of the multiplexer when the attribute is asserted, or to select the bypass around the respective pipeline register to propagate through as the output of the multiplexer when the attribute is not asserted. The multiplexers may or may not actually be instantiated in the target IC.

As previously stated, the programmable IC can have multiple physical memory blocks, such as memory block 300, available for instantiation. These memory blocks can be cascaded, e.g., to facilitate deeper memory implementations.

Figure 4:
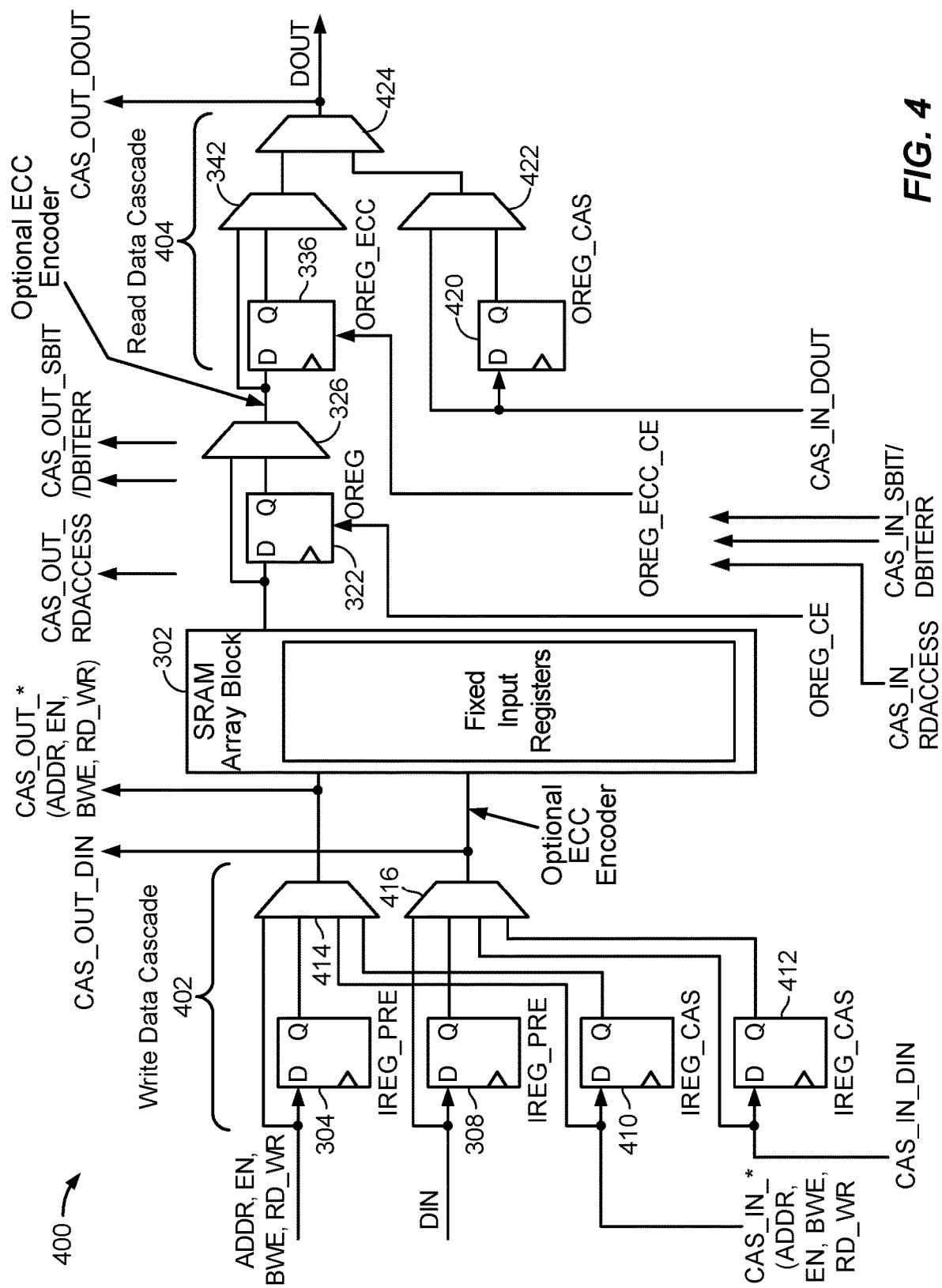
FIG. 4 is a block diagram depicting an example of a functional description of a cascaded memory block that may be instantiated on a programmable IC, in accordance with an example of the present disclosure.

FIG. 4 is a block diagram depicting an example of a functional description of a cascaded memory block 400 that may be instantiated on a programmable IC, in accordance with an example of the present disclosure. The cascaded memory block 400 is generally the memory block 300 of FIG. 3 configured to be cascaded with other memory blocks of the programmable IC. Aspects of the memory block 400 are simplified and/or generalized compared to the memory block 300 of FIG. 3. A person having ordinary skill in the art will readily understand the aspects that have been simplified and/or generalized. For example, ECC encoding and decoding have been omitted from the memory block 400, which may be due to simplification and/or to a configuration of the primitive of the memory block 400. Further, multiple registers are generalized as a single register, in some instances.

The memory block 400 includes a write data cascade 402 and a read data cascade 404. The write data cascade 402 includes the IREG_PREs 304 (e.g., 304a and 304b) and 308 with input nodes coupled as described above with respect to FIG. 3. The write data cascade 402 further includes cascaded input registers 410 and 412 and multiplexers 414 and 416. A cascaded byte-wide write enable input node CAS_IN_BWE, a cascaded read/write mode select input node CAS_IN_RD_WR, a cascaded address input node CAS_IN_ADDR, and a cascaded enable/disable read/write access input node CAS_IN_EN are coupled to input nodes of cascaded input register (IREG_CAS) 410 and to input nodes of the multiplexer 414. Output nodes of the IREG_CAS 410 are coupled to other input nodes of the multiplexer 414. Other respective input nodes of the multiplexer 414 are coupled (1) to output nodes of the IREG_PRE 304 and (2) to the BWE, RD_WR, ADDR, and EN. Output nodes of the multiplexer 414 are coupled (1) to input nodes of the SRAM array block 302 and (2) to cascaded byte-wide write enable output node CAS_OUT_BWE, a cascaded read/write mode select output node CAS_OUT_RD_WR, a cascaded address output node CAS_OUT_ADDR, and a cascaded enable/disable read/write access output node CAS_OUT_EN. A cascaded write data in input node CAS_IN_DIN is coupled to an input node of IREG_CAS 412 and to an input node of the multiplexer 416. An output node of the IREG_CAS 412 is coupled to another input node of the multiplexer 416. Other respective input nodes of the multiplexer 416 are coupled (1) to an output node of the IREG_PRE 308 and (2) to the DIN. An output node of the multiplexer 416 is coupled (1) to an input node of the SRAM array block 302 and (2) to cascaded write data in output node CAS_OUT_DIN.

The read data cascade 404 includes the OREGs 320 and 322, OREG_ECCs 332 and 336, and multiplexers 324, 326, 338, and 342, each of which having input nodes coupled as described above with respect to FIG. 3. Some of these components are not specifically illustrated in FIG. 4 for ease of depiction, but would be understood to be present by a person having ordinary skill in the art. The read data cascade 404 further includes a cascaded output register (OREG_CAS) 420 and multiplexers 422 and 424. A cascaded read data out input node CAS_IN_DOUT is coupled to an input node of OREG_CAS 420 and to an input node of the multiplexer 422. An output node of the OREG_CAS 420 is coupled to another input node of the multiplexer 422. An output node of the multiplexer 422 is coupled to an input node of the multiplexer 424, and an output node of the multiplexer 342 is coupled to another input node of the multiplexer 424. An output node of the multiplexer 424 is coupled to the DOUT and to cascaded read data out output node CAS_OUT_DOUT.

Although not specifically illustrated, the read data cascade 404 includes three groups of an OREG_CAS, a first multiplexer, and a second multiplexer configured like the OREG_CAS, multiplexer 422, and multiplexer 424, respectively. In a first group, a cascaded read status input node CAS_IN_RDACCESS is coupled to an input node of the OREG_CAS and an input node of the first multiplexer; an output node of the OREG_CAS is coupled to another input node of the first multiplexer; an output node of the first multiplexer is coupled to an input node of the second multiplexer; an output node of the multiplexer 338 is coupled to another input node of the second multiplexer; and an output node of the second multiplexer is coupled to RDACCESS and a cascaded read status output node CAS_OUT_RDACCESS. In a second group, a cascaded double-bit error status input node CAS_IN_DBITERR is coupled to an input node of the OREG_CAS and an input node of the first multiplexer; an output node of the OREG_CAS is coupled to another input node of the first multiplexer; an output node of the first multiplexer is coupled to an input node of the second multiplexer; and an output node of the multiplexer 340a is coupled to another input node of the second multiplexer; and an output node of the second multiplexer is coupled to DBITERR and a cascaded double-bit error status output node CAS_OUT_DBITERR. In a third group, a cascaded single-bit error status input node CAS_IN_SBITERR is coupled to an input node of the OREG_CAS and an input node of the first multiplexer; an output node of the OREG_CAS is coupled to another input node of the first multiplexer; an output node of the first multiplexer is coupled to an input node of the second multiplexer; an output node of the multiplexer 340b is coupled to another input node of the second multiplexer; and an output node of the second multiplexer is coupled to SBITERR and a cascaded single-bit error status output node CAS_OUT_SBITERR.

In some examples, cascaded multiplexers, such as multiplexers 342, 422, and 424, may be implemented in the place of 4-to-1 multiplexers, such as multiplexer 414 or 416, or vice versa.

As stated, the memory block 400 is cascaded in a cascade chain of N memory blocks 400 (e.g., block 0 to block N−1). Assuming the memory block 400 of FIG. 4 is block i of N, the cascaded input nodes, e.g., with the prefix "CAS_IN", of block i of N are coupled to corresponding cascaded output nodes, e.g., with the prefix "CAS_OUT", of block i−1 of N. For example, CAS_IN_DIN of block i is coupled to CAS_OUT_DIN of block i−1. Similarly, the cascaded output nodes, e.g., with the prefix "CAS_OUT", of block i of N are coupled to corresponding cascaded input nodes, e.g., with the prefix "CAS_IN", of block i+1 of N. For example, CAS_OUT_DIN of block i is coupled to CAS_IN_DIN of block i+1. In block 0, the memory block 400 may omit the IREG_CASs 410 and 412 and the OREG_CASs (e.g., OREG_CAS 420) and appropriate multiplexers since there is no cascaded block preceding block 0. In block N−1, the memory block may omit the cascaded output nodes, e.g., with the prefix "CAS_OUT", since there is no cascaded block following block N−1.

Any data or signal on a node in the memory block 400 that is a cascaded input node or output node, e.g., with the prefix "CAS_IN" or "CAS_OUT", respectively, can have the same or similar function and format as described above with respect to FIG. 3 for a corresponding node (e.g., DIN to CAS_IN_DIN or CAS_OUT_DIN).

The primitive of the memory block 400 can be configurable to enable a cascade chain of memory blocks 400. For example, one or more attributes of the primitive of the memory block 400 can be set by a user to indicate aspects of the memory block 400 relative to the cascade chain and/or by IDE MODULE 202 or a module of the IDE MODULE 202. In addition to other aspects described below, the memory block 400 can be configurable as the memory block 300 of FIG. 3 is configurable.

A matrix identification attribute MATRIX_ID_ATT can be a unique identifier of the cascade chain to which the memory block is a part. A number of memory blocks in the matrix attribute NUM_MB_IN_MATRIX_ATT configures the size (e.g., the number of memory blocks 400) in the cascade chain matrix. A cascade order attribute CASCADE_ORDER_ATT generally identifies the placement of the memory block in the cascade chain, such as none (e.g., single instance of a block without cascading), first (e.g., block 0), middle (e.g., blocks 1 through N−2), or last (e.g., block N−1). A cascaded input/output pipeline register attribute REG_CAS_ATT configures whether IREG_CASs and OREG_CAS are inserted into the memory block 400. When the REG_CAS_ATT is appropriately asserted and the CASCADE_ORDER_ATT is, e.g., middle or last, IREG_CASs and OREG_CAS are inserted into the memory block 400 for instantiation. Conversely, when the REG_CAS_ATT is not appropriately asserted or the CASCADE_ORDER_ATT is, e.g., first (or none in a single block chain), IREG_CASs and OREG_CAS are not initially inserted into the memory block 400 for instantiation. Logically, this can be viewed as the REG_CAS_ATT and CASCADE_ORDER_ATT being a select control input to respective ones of the multiplexers to select the output of the respective cascade register to propagate through as the output of the multiplexer when the attribute is asserted, or to select the bypass around the respective cascade register to propagate through as the output of the multiplexer when the attribute is not asserted. The multiplexers may or may not actually be instantiated in the target IC.

A user can create a circuit design including a cascade chain of memory blocks 400 by accessing the design entry module 204 through the GUI module 208. The user can, through the GUI module 208, input various connections to and configure attributes of primitives of the memory blocks 400, which primitives may be accessible from the source files 222. The circuit design is converted to a file or other object stored as the RTL source 224. As described above, the logic synthesis module 206 produces a logical description of the circuit design, such as specified by a netlist 228, from the logical description specified in the RTL source 224. The physical synthesis module 210 then produces a physical description of the circuit design from the logical description. The physical description of the circuit design is a physical representation of the circuit design for implementation in a target IC. The timing analysis module 216 performs a timing analysis of the physical description of the circuit design. The timing analysis module 216 verifies that the physical description meets the timing constraints 234 specified by the circuit designer.

Figure 5:
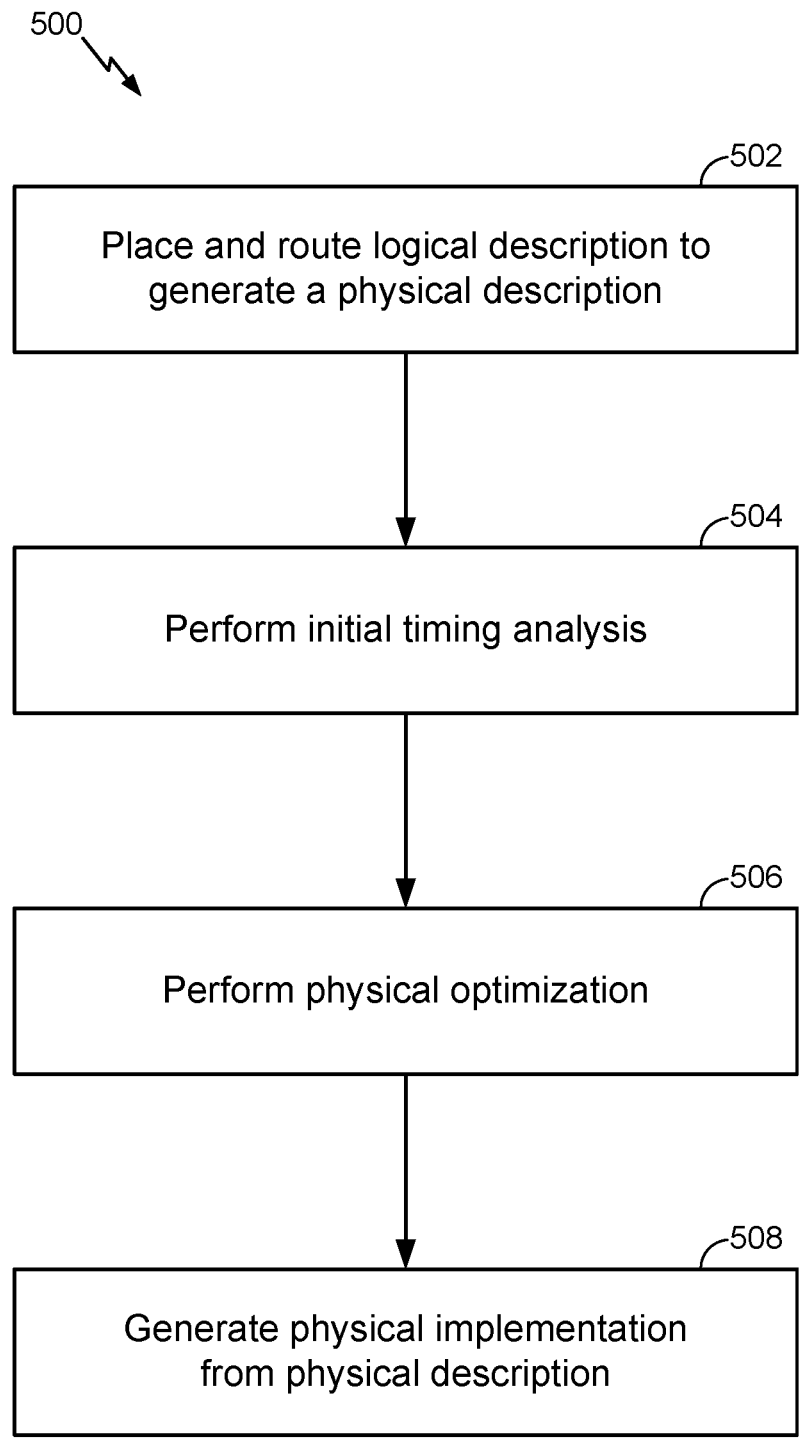
FIG. 5 is a flow diagram depicting an example of a method of implementing a circuit design for an IC, in accordance with an example of the present disclosure.

FIG. 5 is a flow diagram depicting an example of a method 500 of physical synthesis for implementing a circuit design for an IC, in accordance with an example of the present disclosure. The method 500 can be performed by the circuit design tool 110, and more specifically, by the physical synthesis module 210 of the circuit design tool 110. The method 500 begins at block 502, where the place and route module 214 places and routes a logical description of the circuit design to generate a physical description. At block 504, the timing analysis module 216 performs an initial timing analysis of the physical description to obtain an initial timing profile. At block 506, place and route module 214 performs physical optimization (or at least alteration) on the physical description based on the initial timing analysis. At block 508, the physical synthesis module 210 generates a physical implementation for a target IC from the physical description.

The following methods are examples for optimizing (or at least altering to improve) timing of a memory block and/or cascade chain of memory blocks by pulling (e.g., removing) or pushing (e.g., creating and inserting) optional registers from or into, respectively, a memory block during physical synthesis of a circuit design for a programmable IC by the physical synthesis module 210. In some instances, any of the following methods may be performed individually without performing others of the methods; while in other instances, a combination of the methods may be performed during physical synthesis. Although aspects of the following methods are described in the context of the functional descriptions of FIGS. 3 and 4, such as various attributes being asserted, the physical synthesis may be performed on a physical description of the circuit design, and the features in the physical description corresponding to those attributes may be manipulated rather than the attributes of the functional descriptions.

Figure 6:
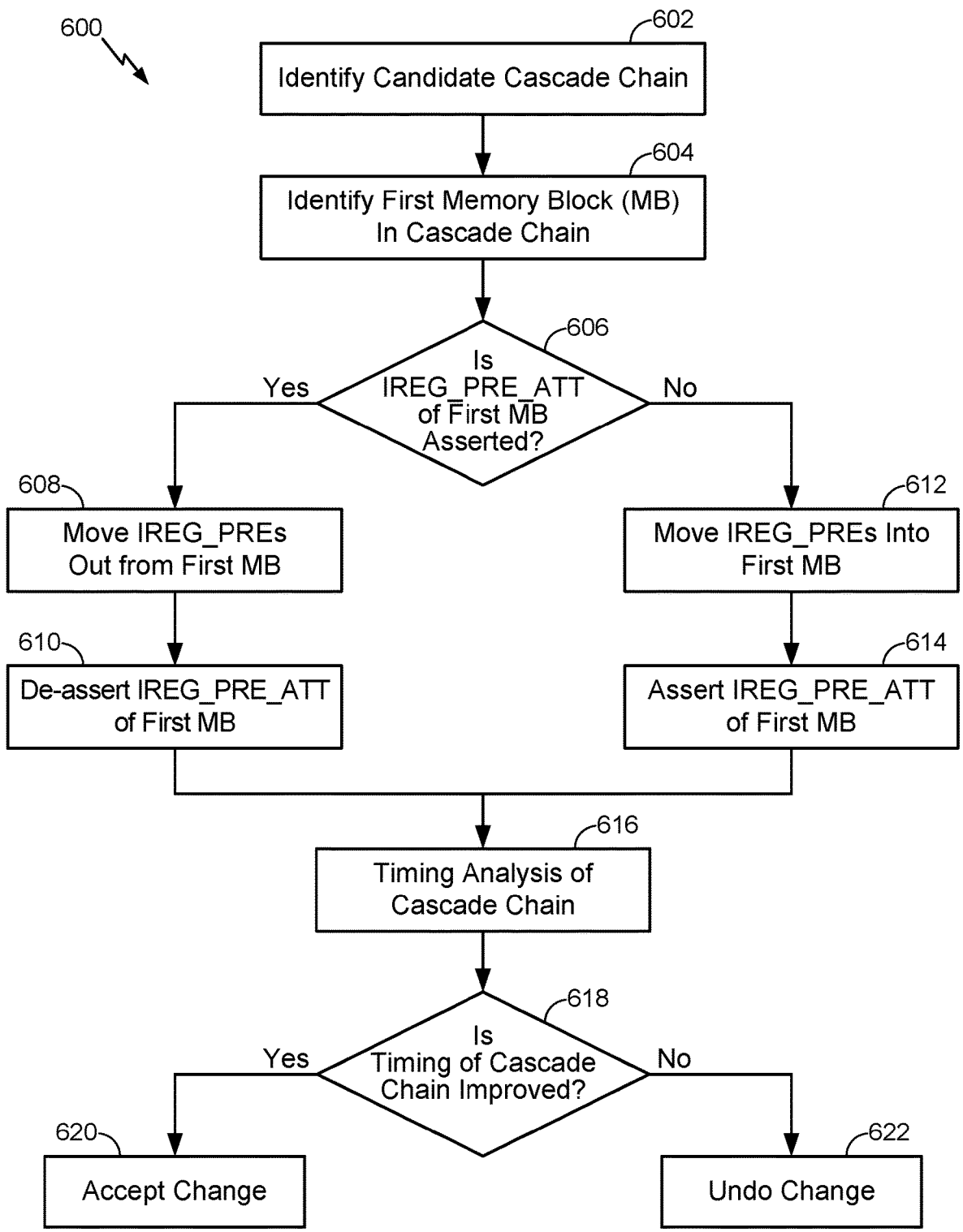
FIG. 6 is a flow diagram depicting an example of a method for performing physical optimization (or at least adjustment) in a standalone or cascaded memory block, in accordance with an example of the present disclosure.

FIG. 6 is a flow diagram depicting an example of a method 600 for performing physical optimization (or at least adjustment for improvement) in a stand-alone or cascaded memory block, in accordance with an example of the present disclosure. In block 602, a candidate cascade chain is identified. The cascade chain can have N memory blocks. For example, N can equal 1 (e.g., a standalone memory block) or can be greater than 1. In block 604, the first memory block in the cascade chain is identified. For example, the CASCADE_ORDER_ATT of the memory block that is configured by the user or IDE MODULE 202 to be first or none can be used to identify the first memory block in the cascade chain.

In block 606, whether the IREG_PRE_ATT of the first memory block is asserted is determined. If IREG_PRE_ATT of the first memory block is asserted, in block 608, the IREG_PREs are moved out from the first memory block, and in block 610, the IREG_PRE_ATT of the first memory block is de-asserted. By moving the IREG_PREs out of the first memory block, new registers may be created, e.g., in a CLB that may be more optimally located for timing compared to the first memory block of the cascade chain. If IREG_PRE_ATT of the first memory block is not asserted, in block 612, new IREG_PREs are moved into the first memory block, and in block 614, the IREG_PRE_ATT of the first memory block is asserted. By moving the IREG_PREs into the first memory block, new registers in the cascade chain may be created that may be more optimally located compared to some location outside of the cascade chain where other registers are located, which registers may be deleted.

Following blocks 610 and 614, in block 616, a timing analysis of the cascade chain is performed to obtain a modified timing profile. In block 618, whether the timing of the cascade chain was improved by the change is determined. For example, the modified timing profile obtained in block 616 can be compared with the initial timing profile obtained in block 504 of FIG. 5. If the timing was improved, in block 620, the change is accepted. If the timing was not improved, in block 622, the change is not accepted and is undone or reversed. By moving registers into or out of the cascade chain as described, registers may be located in positions that improve the timing performance of the device but maintain latency (e.g., number of pipeline registers) of the device.

Figure 7:
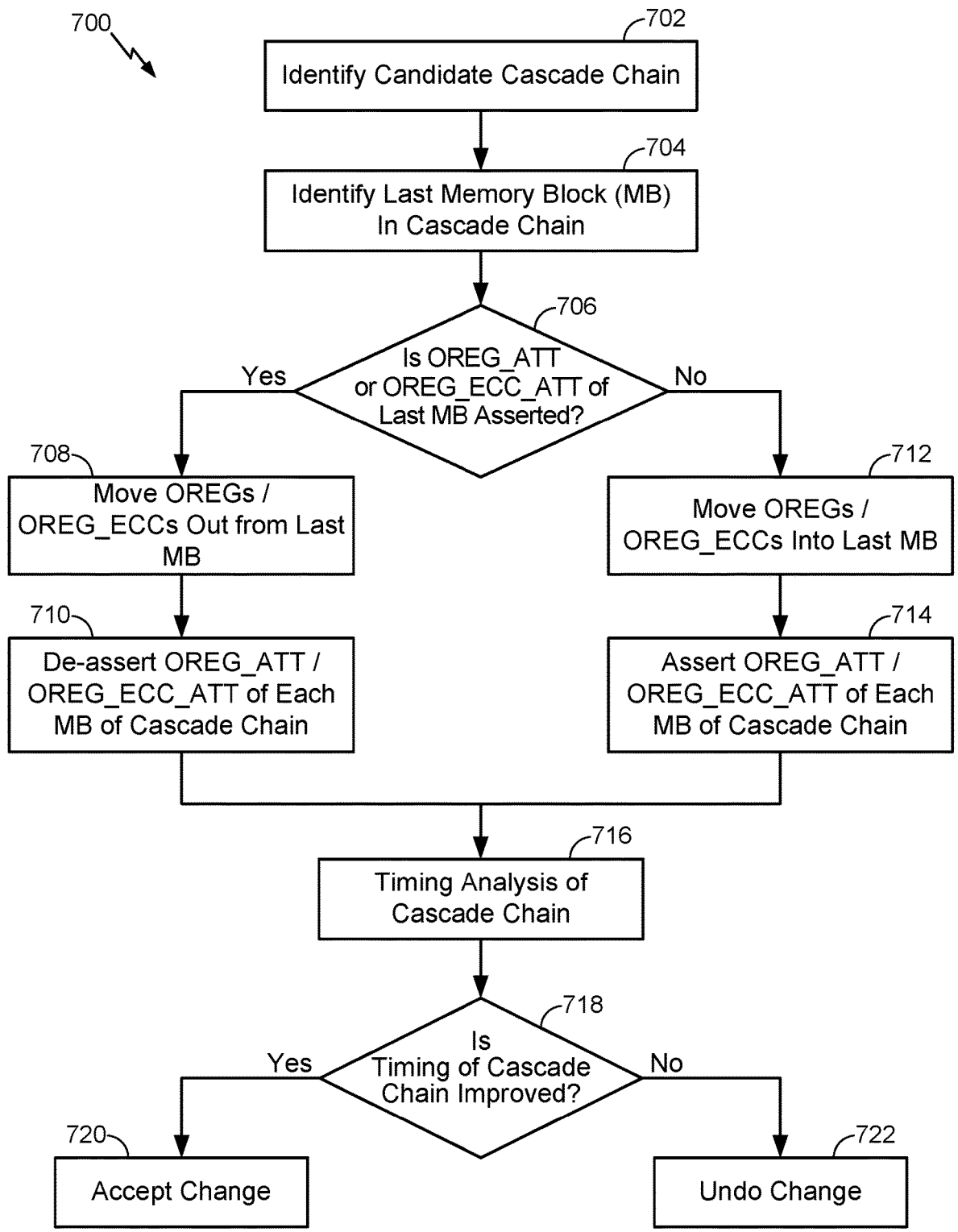
FIG. 7 is a flow diagram depicting an example of a method for performing physical optimization (or at least adjustment) in a cascaded memory block, in accordance with an example of the present disclosure.

FIG. 7 is a flow diagram depicting an example of a method 700 for performing physical optimization (or at least adjustment for improvement) in a cascaded memory block, in accordance with an example of the present disclosure. In block 702, a candidate cascade chain is identified. The cascade chain can have N memory blocks. For example, N can be 2 or greater. In block 704, the last memory block in the cascade chain is identified. For example, the CASCADE_ORDER_ATT of the memory block that is configured by the user or the IDE MODULE 202 to be last can be used to identify the last memory block in the cascade chain.

In block 706, whether the OREG_ATT or OREG_ECC_ATT of the last memory block is asserted is determined. If OREG_ATT or OREG_ECC_ATT of the last memory block is asserted, in block 708, the OREGs and/or the OREG_ECCs are moved out from the last memory block, and in block 710, the corresponding OREG_ATT and OREG_ECC_ATT of the last memory block is de-asserted.

By moving the OREGs and/or the OREG_ECCs out of the last memory block, new registers may be created, e.g., in a CLB that may be more optimally located compared to the last memory block of the cascade chain. If neither the OREG_ATT nor the OREG_ECC_ATT of the last memory block is asserted, in block 712, new OREGs and/or OREG_ECCs are moved into the last memory block, and in block 714, the corresponding OREG_ATT and OREG_ECC_ATT of the last memory block is asserted. By moving the OREGs and/or the OREG_ECCs into the last memory block, new registers in the cascade chain may be created that may be more optimally located compared to some location outside of the cascade chain where other registers are located, which registers may be deleted. In moving the OREGs and/or OREG_ECCs into and/or out from the last memory block, in some examples, OREGs may have priority in being moved because OREGs are generally closer to the SRAM array block, which can favor timing.

Following blocks 710 and 714, in block 716, a timing analysis of the cascade chain is performed to obtain a modified timing profile. In block 718, whether the timing of the cascade chain was improved by the change is determined. For example, the modified timing profile obtained in block 716 can be compared with the initial timing profile obtained in block 504 of FIG. 5. If the timing was improved, in block 720, the change is accepted. If the timing was not improved, in block 722, the change is not accepted and is undone or reversed. By moving registers into or out of the cascade chain as described, registers may be located in positions that improve the timing performance of the device but maintain latency (e.g., number of pipeline registers) of the device.

Figure 8:
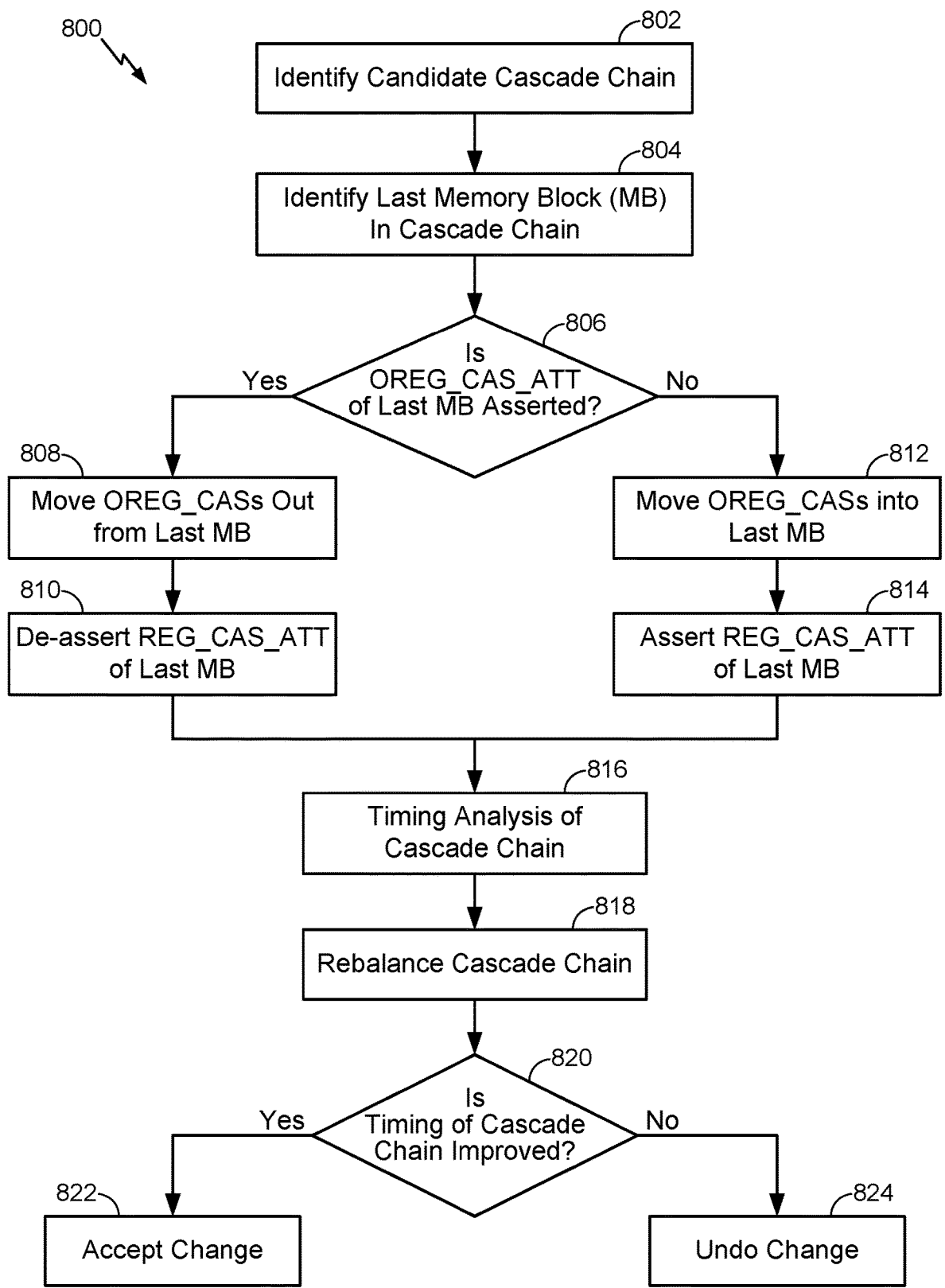
FIG. 8 is a flow diagram depicting an example of a method for performing physical optimization (or at least adjustment) in a cascaded memory block, in accordance with an example of the present disclosure.

FIG. 8 is a flow diagram depicting an example of a method 800 for performing physical optimization (or at least adjustment for improvement) in a cascaded memory block, in accordance with an example of the present disclosure. In block 802, a candidate cascade chain is identified. The cascade chain can have N memory blocks. For example, N can be 2 or greater. In block 804, the last memory block in the cascade chain is identified. For example, the CASCADE_ORDER_ATT of the memory block that is configured by the user or IDE MODULE 202 to be last can be used to identify the last memory block in the cascade chain.

In block 806, whether the REG_CAS_ATT of the last memory block is asserted is determined. If REG_CAS_ATT of the last memory block is asserted, in block 808, the OREG_CASs are moved out from the last memory block, and in block 810, the REG_CAS_ATT of the last memory block is de-asserted. By moving the OREG_CASs out of the last memory block, new registers may be created, e.g., in a CLB that may be more optimally located for timing compared to the last memory block of the cascade chain. If the REG_CAS_ATT of the last memory block is not asserted, in block 812, new OREG_CASs are moved into the last memory block, and in block 814, the REG_CAS_ATT of the last memory block is asserted. By moving the OREG_CASs into the last memory block, new registers in the cascade chain may be created that may be more optimally located compared to some location outside of the cascade chain where other registers are located, which registers may be deleted.

Following blocks 810 and 814, in block 816, a timing analysis of the cascade chain is performed to obtain a modified timing profile. In block 818, the cascade chain is rebalanced, such as described below. Since registers are moved into or out from the cascade chain in blocks 808 and 812, latency (e.g., number of pipeline registers) in the cascade chain changes, and rebalancing may be implemented to tune the timing of the cascade chain, for example. In block 820, whether the timing of the cascade chain was improved by the change is determined. For example, the modified timing profile obtained in block 816 and/or another modified timing profile obtained when rebalancing the cascade chain can be compared with the initial timing profile obtained in block 504 of FIG. 5. If the timing was improved, in block 822, the change is accepted. If the timing was not improved, in block 824, the change is not accepted and is undone or reversed.

Figure 9A:
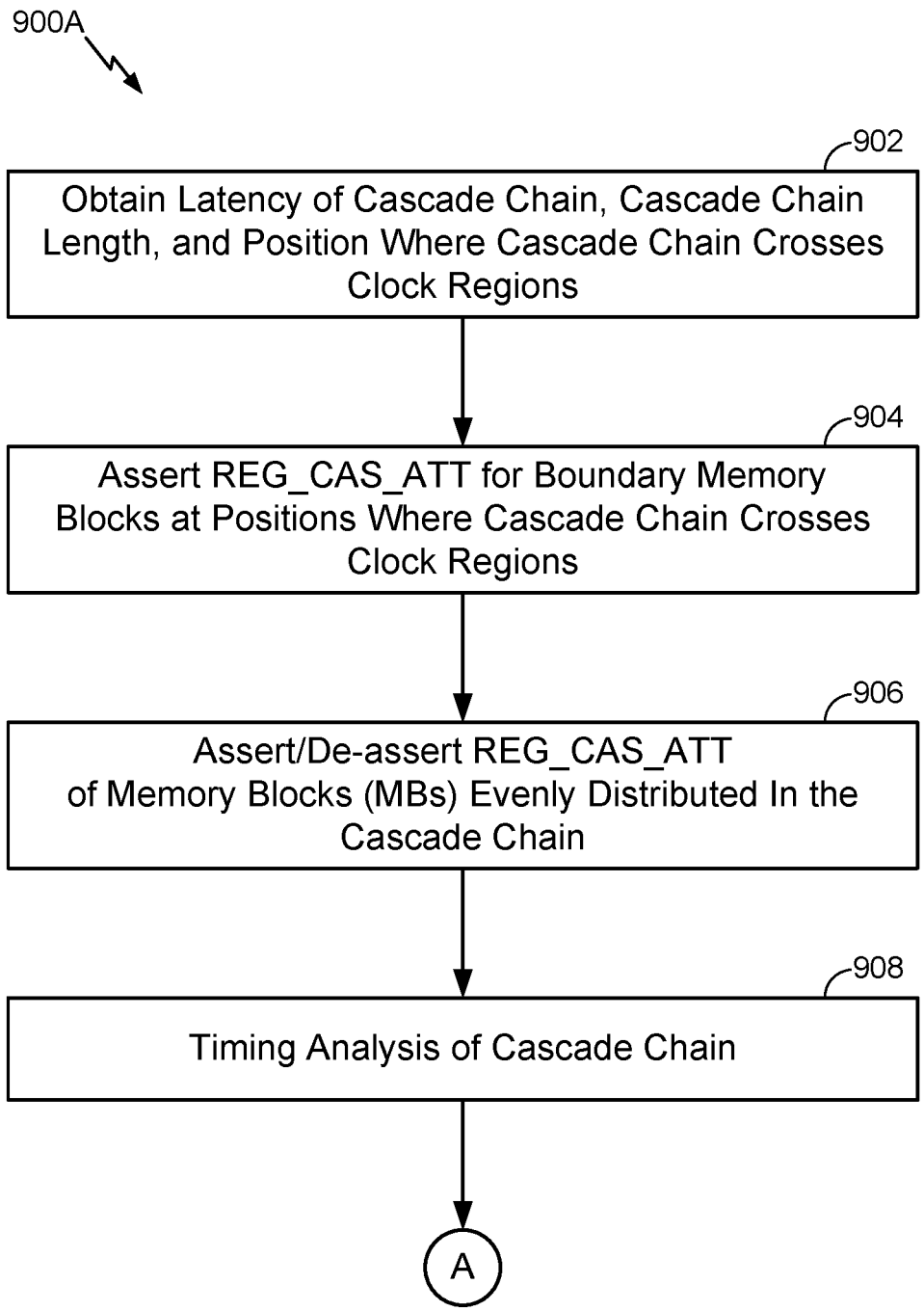
FIGS. 9A and 9B are a flow diagram depicting an example of a method for rebalancing a cascaded memory block, in accordance with an example of the present disclosure.
Figure 9B:
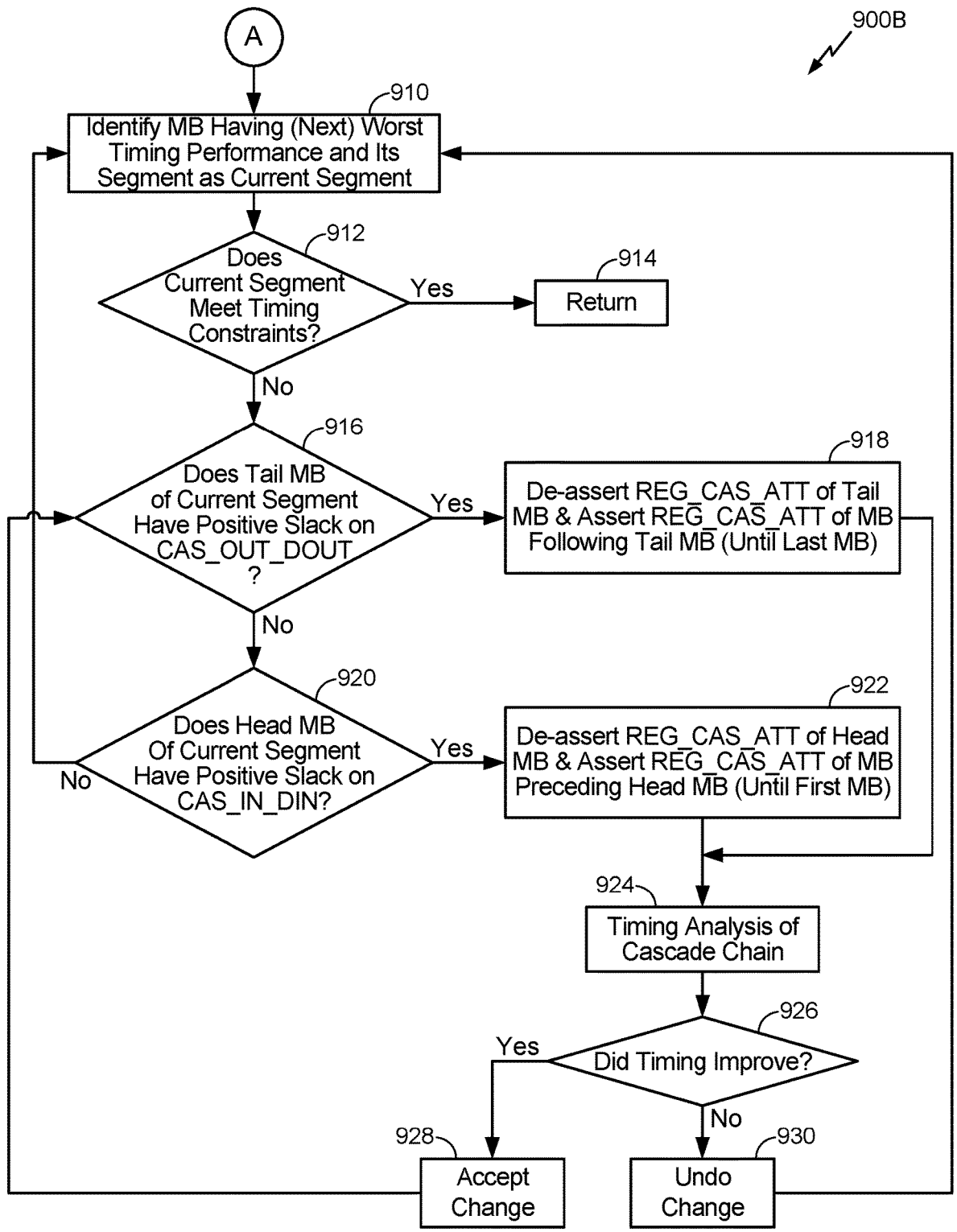

FIGS. 9A and 9B are a flow diagram depicting an example of a method 900A and 900B for rebalancing a cascade chain of memory blocks, in accordance with an example of the present disclosure. For any given cascade chain, typically, some memory blocks will be configured to have REG_CAS_ATT asserted, while other memory blocks will be configured to have REG_CAS_ATT not asserted. This provides an opportunity to balance the placement of OREG_CASs in the chain. Hence, rebalancing of the placement of OREG_CASs may be performed after moving OREG_CASs into or out from a cascade chain as described with respect to FIG. 8, since moving registers into or out from the cascade chain can cause an unbalance and can change the latency of the cascade chain. Further, a cascade chain can have memory blocks that are in different clock regions, such as if the size of the cascade chain is sufficiently large. Some skew may be present between clocks of different clock regions. Hence, to address possible skew between clocks, OREG_CASs may be implemented where the cascade chain crosses clock regions.

In block 902, latency of the cascade chain, the cascade chain length, and one or more positions where the cascade chain crosses between clock regions are obtained. The latency (e.g., the number of pipeline registers in the cascade chain) may be obtained from a previously performed timing analysis, like in block 816 of FIG. 8, and/or by scanning the cascade chain and counting the number of memory blocks that have REG_CAS_ATT asserted. The cascade chain length may be obtained by scanning the cascade chain from the memory block that has CASCADE_ORDER_ATT set as first and counting the memory blocks through the memory block that has CASCADE_ORDER_ATT set as last.

As an example to identify where the cascade chain crosses between clock regions, the device is first subdivided into columns and rows of segmented clock regions. This information is static and pre-determined per each device. Each memory block is associated with one clock region according to its location in the device. By scanning the locations of memory blocks on a cascade chain, two boundary memory blocks can be identified at a position where the clock region association is changed from one region for an "exit" boundary memory block to another region for an "entry" boundary memory block These two memory blocks can be prioritized to have REG_CAS_ATT asserted, if possible, as described below.

In block 904, REG_CAS_ATT is asserted for boundary memory blocks that are identified for positions at which the cascade chain crosses between clock regions, if possible. By asserting REG_CAS_ATT in these boundary memory blocks, differences in clock latencies between clock regions can be mitigated. If a total number of pipeline registers in the cascade chain is less than the number of boundary memory blocks at positions where the cascade chain crosses between clock regions, the cascade chain is scanned from the memory block with CASCADE_ORDER_ATT set as first, and boundary memory blocks occurring first in the scanning of the cascade chain are set to have REG_CAS_ATT asserted until the number of boundary memory blocks with REG_CAS_ATT asserted equals the total number of pipeline registers in the cascade chain. Later boundary memory blocks in the cascade chain can have REG_CAS_ATT not be asserted. Hence, initial boundary memory blocks may have priority over subsequent boundary memory blocks for having REG_CAS_ATT asserted.

In block 906, REG_CAS_ATTs of memory blocks are asserted/de-asserted in various memory blocks evenly distributed, to the extent possible, in the cascade chain, with REG_CAS_ATT remaining asserted for boundary memory blocks at positions where the cascade chain crosses between clock regions. If the total number of pipeline registers in the cascade chain exceeds the number of boundary memory blocks at positions where the cascade chain crosses between clock regions, the remaining number of pipeline registers are evenly distributed, to the extent possible, throughout the cascade chain, which can further take into consideration the locations of the boundary memory blocks for which REG_CAS_ATT is asserted. By evenly distributing in which memory blocks REG_CAS_ATT is asserted, a repeating pattern of memory blocks in the cascade chain having REG_CAS_ATT asserted and not asserted may be obtained. In some situations, rounding may be implemented to obtain an even distribution where a repeating pattern may not be possible because, for example, a number of instances where REG_CAS_ATT is asserted does not divide evenly into the total number of memory blocks of the cascade chain. The operations of blocks 904 and 906 may roughly balance the cascade chain. In block 908, a timing analysis of the cascade chain is performed.

In block 910, a memory block having a (next) worst timing performance and its corresponding segment are identified, and the segment is identified as a current segment. The segment of the memory block begins at a tail memory block where REG_CAS_ATT is asserted and extends through the head memory block where REG_CAS_ATT is asserted next, and the memory block is one of the memory blocks in the segment. The tail memory block is the memory block of the respective segment that has REG_CAS_ATT asserted and is most proximate the memory block of the cascade chain having CASCADE_ORDER_ATT set as first. The head memory block is the memory block of the respective segment that has REG_CAS_ATT asserted and is most proximate the memory block of the cascade chain having CASCADE_ORDER_ATT set as last. In some instances, after one or more iterations of various blocks as described herein, a memory block having the worst timing performance and its segment may have already been analyzed, and in these instances, the analysis moves to the memory block having the next worst timing performance and its segment. This iterative analysis can continue until all segments that do not meet timing performance constraints have been analyzed.

In block 912, whether the current segment meets timing constraints is determined. If the current segment meets timing constraints, in block 914, rebalancing is concluded, and the method returns execution to the calling program, routine, etc.

Referring back to block 912, if the current segment does not meet timing constraints, in block 916, whether the tail memory block of the current segment has positive slack on CAS_OUT_DOUT of the tail memory block is determined. If the tail memory block has positive slack, in block 918, REG_CAS_ATT of the tail memory block is de-asserted, and the REG_CAS_ATT of the memory block following the tail memory block (e.g., the next memory block of the segment more proximate to the memory block of the cascade chain having CASCADE_ORDER_ATT set as last) is asserted, until the following memory block is the last memory block of the cascade chain. This effectively shortens the segment being analyzed by one memory block being removed from the tail of the segment, and conversely, lengthens an adjoining segment of the cascade chain to which the memory block that is removed from the segment being analyzed is appended.

Referring back to block 916, if the tail memory block does not have positive slack, in block 920, whether the head memory block of the current segment has positive slack on CAS_IN_DIN of the head memory block is determined. If the head memory block has positive slack, in block 922, REG_CAS_ATT of the head memory block is de-asserted, and the REG_CAS_ATT of the memory block preceding the head memory block (e.g., the next memory block of the segment more proximate to the memory block of the cascade chain having CASCADE_ORDER_ATT set as first) is asserted, until the preceding memory block is the first memory block of the cascade chain. This effectively shortens the segment being analyzed by one memory block being removed from the head of the segment, and conversely, lengthens an adjoining segment of the cascade chain to which the memory block that is removed from the segment being analyzed is appended.

After the changes of block 918 or 922, in block 924, a timing analysis of the cascade chain is performed. In block 926, whether timing improved as a result of the change of block 918 or 922 is determined. If timing improved, in block 928, the change of block 918 or 922 is accepted, and execution of the method 900 iteratively returns to block 916. If timing is not improved, in block 930, the change of block 918 or 922 is undone or reversed, and execution of the method 900 iteratively returns to block 910. Referring back to bock 922, if the head memory block does not have positive slack, execution of the method 900 iteratively returns to block 910.

Generally, the operations of blocks 916 through 930 permit fine tuning of the balancing of the cascade chain. For each segment of the cascade chain that fails to meet timing constraints, the segment may be shortened at the tail or the head of the segment if positive slack is at the tail or the head of the segment, respectively. If the shortening improves the timing performance of the cascade chain, the shortening is accepted, and the iterative loop continues to attempt to shorten the segment to further improve timing performance. The segment can be repeatedly shortened by looping through operations of the method until the shortening does not improve timing performance, at which point the shortening of that iteration of the loop is undone, and another segment may be analyzed. The rebalancing of FIGS. 9A and 9B can include additional logic, such as to prevent infinite looping, and can maintain a total latency (e.g., number of pipeline registers) of the cascade chain.

Techniques described herein can optimize (or at least improve) timing by pulling or pushing optional registers to obtain a physical implementation with optimally placed drivers with respect to corresponding loads. This can facilitate significant quality of results (QoRs) improvements in circuit designs.

The various examples described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more example implementations may be useful machine operations. In addition, one or more examples also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various examples described herein may be practiced with other computer system configurations including handheld devices, microprocessor systems, microprocessor-based or programmable consumer electronics, minicomputers, mainframe computers, and the like.

One or more examples may be implemented as one or more computer programs or as one or more computer program modules embodied in one or more non-transitory computer-readable media. The term non-transitory computer-readable medium refers to any data storage device that can store (e.g., non-transitory) data which can thereafter be input to a computer system—computer-readable media may be based on any existing or subsequently developed technology for embodying computer programs in a manner that enables them to be read by a computer. Examples of a non-transitory computer-readable medium include a hard drive, network attached storage (NAS), read-only memory, random-access memory (e.g., a flash memory device), a Compact Disc (CD)-ROM, a CD-R, or a CD-RW, a DVD (Digital Versatile Disc), a magnetic tape, and other optical and non-optical data storage devices. The non-transitory computer-readable medium can also be distributed over a network coupled computer system so that the computer-readable code is stored and executed in a distributed fashion.

While the foregoing is directed to specific examples, other and further examples may be devised without departing from the basic scope thereof, and the scope thereof is determined by the claims that follow.

What is claimed is:

1. A method of implementing a circuit design, comprising:
placing and routing a logical description of the circuit design to generate a physical description corresponding to a predefined physical layout of a programmable integrated circuit, the circuit design comprising a memory block;
executing a first timing analysis to determine a first timing profile of the physical description;
altering the physical description, comprising:
selectively moving from or into the memory block of the physical description one or more registers in response to an attribute of the memory block, wherein the attribute indicates whether the one or more registers are implemented in the memory block;
executing a second timing analysis to determine a second timing profile of the physical description with the one or more registers moved from or into the memory block of the physical description;
comparing the second timing profile to the first timing profile; and selectively accepting or reversing the moving from or into the memory block of the physical description the one or more registers based on the comparison of the second timing profile to the first timing profile; and
generating a physical implementation of the circuit design for the programmable integrated circuit based on the altered physical description.

2. The method of claim 1, wherein:
the memory block is (i) a standalone memory block, or (ii) a sequentially first one of a plurality of cascaded memory blocks;
the one or more registers selectively moved from or into the memory block are one or more input pipeline registers;
the attribute indicates whether the one or more input pipeline registers are implemented in the memory block;
the one or more input pipeline registers are moved from the memory block when the attribute indicates that the one or more input pipeline registers are implemented in the memory block; and
the one or more input pipeline registers are moved into the memory block when the attribute indicates that the one or more input pipeline registers are not implemented in the memory block.

3. The method of claim 1, wherein:
the memory block is a sequentially last one of a plurality of cascaded memory blocks;
the one or more registers selectively moved from or into the memory block are one or more output pipeline registers;
the attribute indicates whether the one or more output pipeline registers are implemented in the memory block;
the one or more output pipeline registers are moved from the memory block when the attribute indicates that the one or more output pipeline registers are implemented in the memory block; and
the one or more output pipeline registers are moved into the memory block when the attribute indicates that the one or more output pipeline registers are not implemented in the memory block.

4. The method of claim 1, wherein:
the memory block is a sequentially last one of a plurality of cascaded memory blocks;
the one or more registers selectively moved from or into the memory block are one or more output Error Correction Coding (ECC) registers;
the attribute indicates whether the one or more output ECC registers are implemented in the memory block;
the one or more output ECC registers are moved from the memory block when the attribute indicates that the one or more output ECC registers are implemented in the memory block; and
the one or more output ECC registers are moved into the memory block when the attribute indicates that the one or more output ECC registers are not implemented in the memory block.

5. The method of claim 1, wherein:
the memory block is a sequentially last one of a plurality of cascaded memory blocks;
the one or more registers selectively moved from or into the memory block are one or more cascaded output registers;
the attribute indicates whether the one or more cascaded output registers are implemented in the memory block;

the one or more cascaded output registers are moved from the memory block when the attribute indicates that the one or more cascaded output registers are implemented in the memory block; and the one or more cascaded output registers are moved into the memory block when the attribute indicates that the one or more cascaded output registers are not implemented in the memory block.

6. The method of claim 5, wherein altering the physical description further comprises rebalancing the plurality of cascaded memory blocks.

7. The method of claim 6, wherein rebalancing the plurality of cascaded memory blocks comprises selectively shortening a segment of the plurality of cascaded memory blocks based on whether positive slack is present in the segment when the segment does not meet a timing constraint.

8. The method of claim 1, wherein:
the moving from or into the memory block of the physical description the one or more registers is accepted when the comparison of the second timing profile to the first timing profile indicates that the second timing profile contains an improvement over the first timing profile; and the moving from or into the memory block of the physical description the one or more registers is reversed when the comparison of the second timing profile to the first timing profile indicates that the second timing profile does not contain an improvement over the first timing profile.

9. A circuit design system comprising:
a hardware platform comprising a central processing unit (CPU) and a memory; and
a circuit design tool comprising instructions stored on the memory and executable by the CPU in the hardware platform, the circuit design tool configured to:
place and route a logical description of a circuit design to generate a physical description corresponding to a predefined physical layout of a programmable integrated circuit, the circuit design comprising a memory block;
execute a first timing analysis to determine a first timing profile of the physical description;
alter the physical description, comprising:
selectively moving from or into the memory block of the physical description one or more registers in response to an attribute of the memory block, wherein the attribute indicates whether the one or more registers are implemented in the memory block;
executing a second timing analysis to determine a second timing profile of the physical description with the one or more registers moved from or into the memory block of the physical description;
comparing the second timing profile to the first timing profile; and
selectively accepting or reversing the moving from or into the memory block of the physical description the one or more registers based on the comparison of the second timing profile to the first timing profile; and
generate a physical implementation of the circuit design for the programmable integrated circuit based on the altered physical description.

10. The circuit design system of claim 9, wherein:
the memory block is (i) a standalone memory block, or (ii) a sequentially first one of a plurality of cascaded memory blocks;
the one or more registers selectively moved from or into the memory block are one or more input pipeline registers;
the attribute indicates whether the one or more input pipeline registers are implemented in the memory block;
the one or more input pipeline registers are moved from the memory block when the attribute indicates that the one or more input pipeline registers are implemented in the memory block; and
the one or more input pipeline registers are moved into the memory block when the attribute indicates that the one or more input pipeline registers are not implemented in the memory block.

11. The circuit design system of claim 9, wherein:
the memory block is a sequentially last one of a plurality of cascaded memory blocks;
the one or more registers selectively moved from or into the memory block are one or more output pipeline registers;
the attribute indicates whether the one or more output pipeline registers are implemented in the memory block;
the one or more output pipeline registers are moved from the memory block when the attribute indicates that the one or more output pipeline registers are implemented in the memory block; and
the one or more output pipeline registers are moved into the memory block when the attribute indicates that the one or more output pipeline registers are not implemented in the memory block.

12. The circuit design system of claim 9, wherein:
the memory block is a sequentially last one of a plurality of cascaded memory blocks;
the one or more registers selectively moved from or into the memory block are one or more output Error Correction Coding (ECC) registers;
the attribute indicates whether the one or more output ECC registers are implemented in the memory block;
the one or more output ECC registers are moved from the memory block when the attribute indicates that the one or more output ECC registers are implemented in the memory block; and
the one or more output ECC registers are moved into the memory block when the attribute indicates that the one or more output ECC registers are not implemented in the memory block.

13. The circuit design system of claim 9, wherein:
the memory block is a sequentially last one of a plurality of cascaded memory blocks;
the one or more registers selectively moved from or into the memory block are one or more cascaded output registers;
the attribute indicates whether the one or more cascaded output registers are implemented in the memory block;
the one or more cascaded output registers are moved from the memory block when the attribute indicates that the one or more cascaded output registers are implemented in the memory block; and
the one or more cascaded output registers are moved into the memory block when the attribute indicates that the one or more cascaded output registers are not implemented in the memory block.

14. The circuit design system of claim 13, wherein altering the physical description further comprises rebalancing the plurality of cascaded memory blocks.

15. The circuit design system of claim 9, wherein:
the moving from or into the memory block of the physical description the one or more registers is accepted when the comparison of the second timing profile to the first timing profile indicates that the second timing profile contains an improvement over the first timing profile; and
the moving from or into the memory block of the physical description the one or more registers is reversed when the comparison of the second timing profile to the first timing profile indicates that the second timing profile does not contain an improvement over the first timing profile.

16. A non-transitory computer-readable medium having instructions stored thereon that, when executed by a processor, cause the processor to perform operations for implementing a circuit design, the operations comprising:
placing and routing a logical description of the circuit design to generate a physical description corresponding to a predefined physical layout of a programmable integrated circuit, the circuit design comprising a memory block;
executing a first timing analysis to determine a first timing profile of the physical description;
altering the physical description, comprising:
selectively moving from or into the memory block of the physical description one or more registers in response to an attribute of the memory block, wherein the attribute indicates whether the one or more registers are implemented in the memory block;
executing a second timing analysis to determine a second timing profile of the physical description with the one or more registers moved from or into the memory block of the physical description;
comparing the second timing profile to the first timing profile; and
selectively accepting or reversing the moving from or into the memory block of the physical description the one or more registers based on the comparison of the second timing profile to the first timing profile; and
generating a physical implementation of the circuit design for the programmable integrated circuit based on the altered physical description.

17. The non-transitory computer-readable medium of claim 16, wherein:
the memory block is (i) a standalone memory block, or (ii) a sequentially first one of a plurality of cascaded memory blocks;
the one or more registers selectively moved from or into the memory block are one or more input pipeline registers;
the attribute indicates whether the one or more input pipeline registers are implemented in the memory block;
the one or more input pipeline registers are moved from the memory block when the attribute indicates that the one or more input pipeline registers are implemented in the memory block; and
the one or more input pipeline registers are moved into the memory block when the attribute indicates that the one or more input pipeline registers are not implemented in the memory block.

18. The non-transitory computer-readable medium of claim 16, wherein:
the memory block is a sequentially last one of a plurality of cascaded memory blocks;
the one or more registers selectively moved from or into the memory block are one or more output pipeline registers;
the attribute indicates whether the one or more output pipeline registers are implemented in the memory block;
the one or more output pipeline registers are moved from the memory block when the attribute indicates that the one or more output pipeline registers are implemented in the memory block; and
the one or more output pipeline registers are moved into the memory block when the attribute indicates that the one or more output pipeline registers are not implemented in the memory block.

19. The non-transitory computer-readable medium of claim 16, wherein:
the memory block is a sequentially last one of a plurality of cascaded memory blocks;
the one or more registers selectively moved from or into the memory block are one or more output Error Correction Coding (ECC) registers;
the attribute indicates whether the one or more output ECC registers are implemented in the memory block;
the one or more output ECC registers are moved from the memory block when the attribute indicates that the one or more output ECC registers are implemented in the memory block; and
the one or more output ECC registers are moved into the memory block when the attribute indicates that the one or more output ECC registers are not implemented in the memory block.

20. The non-transitory computer-readable medium of claim 16, wherein:
the memory block is a sequentially last one of a plurality of cascaded memory blocks;
the one or more registers selectively moved from or into the memory block are one or more cascaded output registers;
the attribute indicates whether the one or more cascaded output registers are implemented in the memory block;
the one or more cascaded output registers are moved from the memory block when the attribute indicates that the one or more cascaded output registers are implemented in the memory block; and
the one or more cascaded output registers are moved into the memory block when the attribute indicates that the one or more cascaded output registers are not implemented in the memory block.

* * * * *